Patented Oct. 1, 1974

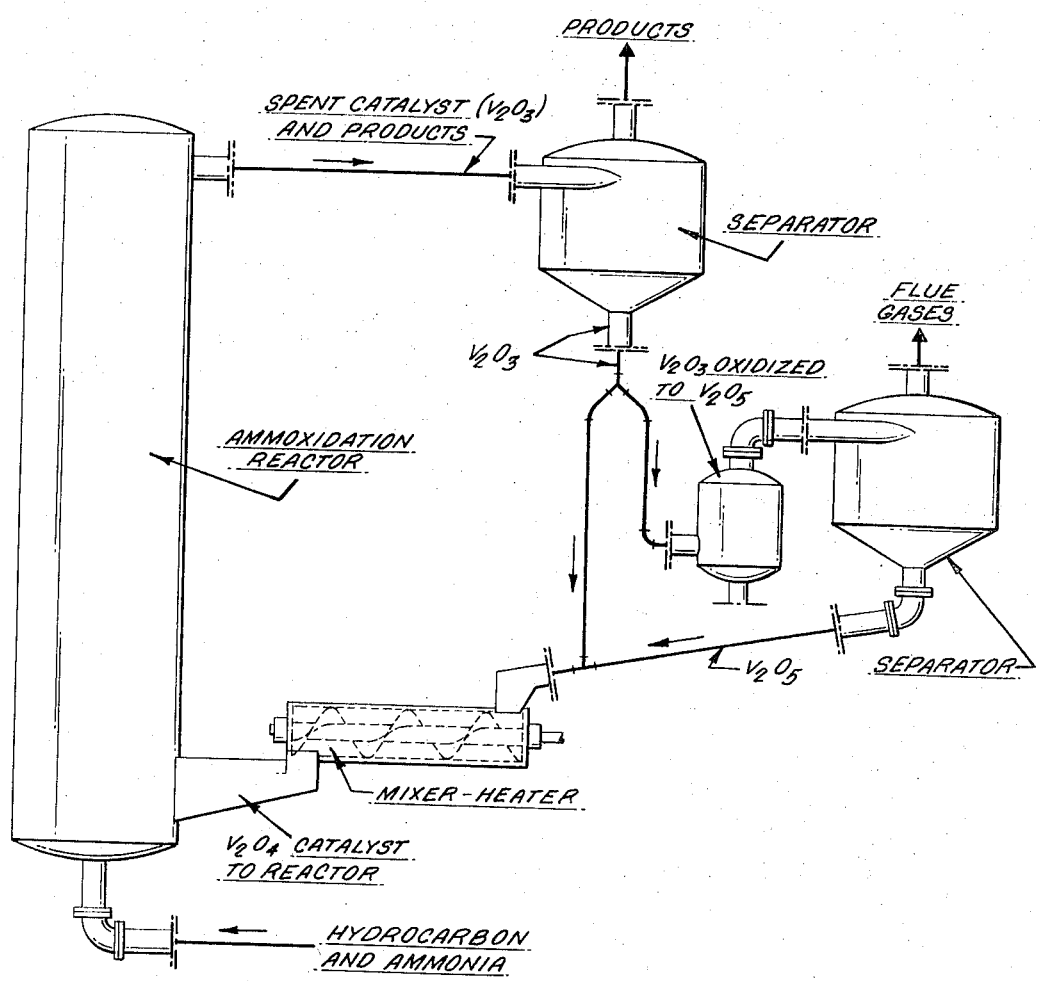

3,839,398
AMMOXIDATION PROCESS

Joseph R. Leto, Concord Township, and John D. Potts, Springfield, Pa., and Jer-Yu Shang, Wilmington, Del., assignors to Sun Research and Development Co., Philadelphia, Pa.
Filed Nov. 29, 1972, Ser. No. 310,306
Int. Cl. C07c 121/02
U.S. Cl. 260—465 C      4 Claims

ABSTRACT OF THE DISCLOSURE

In the process of carrying out ammoxidation reactions in a moving bed reactor using $V_2O_4$ as catalyst, the improvement which comprises: (a) separating spent catalyst consisting essentially of $V_2O_3$ from ammoxidation products and unreacted starting materials, (b) oxidizing a portion of said $V_2O_3$ to $V_2O_5$, (c) mixing said $V_2O_5$ with the remaining $V_2O_3$, (d) heating said mixture to a temperature between about 350° to about 500° C. whereby $V_2O_4$ is formed, and (e) feeding said $V_2O_4$ to said ammoxidation process for use as catalyst.

---

It is known in the art of ammoxidation processes that oxides of vanadium are effective catalysts for the reaction. Thus, for example, U.S. 2,450,639 discloses $VO$, $VO_2$, $V_2O_3$ and $V_2O_5$ as useful ammoxidation catalysts, the preferred catalyst being $V_2O_5$ which is preferably preconditioned by treatment with ammonia or hydrogen. However, it has been determined recently that intermediate oxides such as $V_2O_4$ essentially devoid of $V_2O_5$ are preferred catalysts in the ammoxidation of hydrocarbons carried out in the absence of added oxygen since such catalysts mitigate the formation of carbon oxides, thereby increasing the efficiency of the reaction for the formation of nitrile products (see the application of Angstadt et al filed of even date herewith). In using $V_2O_4$ in ammoxidation reactions where hydrocarbon and ammonia are reacted in the absence of added oxygen, the catalyst becomes reduced to $V_2O_3$ which is inactive as a catalyst. As pointed out in the above-mentioned application of Angstadt et al., it is desirable to regenerate the $V_2O_4$ catalyst as soon as $V_2O_3$ builds up to a significant amount and this is particularly true in a fixed-bed system. In moving-bed systems, however, it may not be an economic disadvantage to permit greater $V_2O_3$ build-up before regeneration, and, in fact, the spent portion of the catalyst may be entirely converted to $V_2O_3$ by the excess ammonia and hydrocarbon in the areas of the system where the ammoxidation reaction is completed.

This invention provides a novel process for making a $V_2O_4$ catalyst which is integrated with the ammoxidation step of a moving-bed system and thereby achieves a highly efficient overall ammoxidation system. In accord with the invention, a significant improvement is imparted to ammoxidation reactions carried out in a moving-bed reactor using $V_2O_4$ as catalyst and without added oxygen by (a) separating spent catalyst consisting essentially of $V_2O_3$ from ammoxidation products and unreacted starting materials, (b) oxidizing a portion of said $V_2O_3$ to $V_2O_5$, (c) mixing said $V_2O_5$ with the remaining $V_2O_3$, (d) heating said mixture of $V_2O_3$ and $V_2O_5$ to a temperature of from about 350° C. to about 500° C. whereby $V_2O_4$ is formed, and (e) feeding said $V_2O_4$ to said ammoxidation for use as catalyst.

An understanding of the invention is evident from the drawing. As seen there an ammoxidation reactor is fed with ammonia and hydrocarbon reactants and also with $V_2O_4$ catalyst. The $V_2O_4$ catalyst may be unsupported or supported on any of the conventional catalyst supports exemplified by alumina, silica, silica-alumina, and the like. A supported catalyst will generally contain the catalyst at a level of from about 0.5% to about 98% by weight, preferably at a level of about 20% to about 80% by weight of catalyst on the support. The reactor is a moving-bed type which will include a moving fluidized bed. The reaction products which comprise nitriles and unreacted feed materials exit from the top of the reactor together with spent catalyst which will be $V_2O_3$ to a large extent resulting from the reduction of the $V_2O_4$. Catalyst and gaseous products are separated, preferably by use of a cyclone separation technique and the gaseous materials taken for further workup which will involve separation of the desired nitrile products and recycling unreacted or partially reacted materials.

The spent catalyst comprised of $V_2O_3$ will then be separated into two parts, one part, comprising about 50 mole percent, being fed into an oxidizer for conversion to $V_2O_5$. This oxidation may be accomplished readily by passing air or other oxygen containing gas over the vanadium oxide held at about 500° C. The oxidation may readily be accomplished in a cyclone which will provide intimate contact between catalyst solids and the oxidizing gas. The oxidized catalyst comprising $V_2O_5$ is separated from the gases (again a cyclone separator is quite satisfactory) and the catalyst recombined with the remaining portion of $V_2O_3$. It will be understood that the $V_2O_3$ and $V_2O_5$ will be finely divided particles and will be combined in essentially stoichiometric amounts for the reaction:

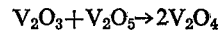

$$V_2O_3 + V_2O_5 \rightarrow 2V_2O_4$$

The mixture of $V_2O_3$ and $V_2O_5$ is then fed to a mixer-heater where thorough mixing and the temperature is maintained between about 350° C. and 500° C. (See "The Chemistry of Titanium and Vanadium" by R. J. H. Clark; Elsevier Publishing Co., 1968 for details of this reaction.) The resulting $V_2O_4$ exiting from the mixer-heater is then fed back into the ammoxidation reactor where the cycle begins anew.

It will be understood that the moving bed in the ammoxidation reactor may be reversed from that shown and it will also be understood that the process is useful with the numerous ammoxidation processes known in the art. Thus, the organic reactants useful in the process may be selected from a wide variety of compounds and will include alkyl-substituted aromatic, aliphatic, alicyclic, and heterocyclic compounds. Among preferred starting materials are the mono- and polyalkyl-substituted aromatic hydrocarbons such as toluene, the xylenes, mesitylene, pseudocumene, durene, pentamethylbenzene, 2-methyl-naphthalene, polymethylnaphthalenes, such as 2,6-, 2,7-, 1,5-, 1,8-, and 2,3-dimethylnaphthalene, monoalkyl and polyalkylanthracenes, and the like. The alkyl substitutent may, of course, contain more than a single carbon atom and thus the corresponding ethyl, propyl, butyl, hexyl, and other alkyl substituents are also useful.

Aliphatic compounds normally subjected to ammoxidation include the olefinic compounds. Thus, any olefinic hydrocarbon having at least one alkyl group is useful in the process. Examples of such compounds are propylene, butenes, octenes, methyl heptenes, alkylbutadienes, pentadienes, ethyl butenes, hexadienes, heptadienes, and the like, all of which will give the corresponding nitriles. Preferred olefins are those containing up to about ten carbon atoms, particularly propylene, butenes, and the methylbutadienes, and cycloolefinic compounds, particularly the alkylsubstituted hydrocarbon olefins exemplified by 3-methylcyclohexene, 3,6-dimethyl cyclohexene, methyltetralin, and the like.

Also of value as reactants are alicyclic compounds having an alkyl substituent and these compounds are exemplified by methylcyclopentane, methylcyclohexane, the alkyl-substituted tetralins, decalins, and the like.

The heterocyclic compounds useful as organic reactants in the process will include alkyl-substituted furans, pyrroles, indoles, thiophenes, pyrazoles, imidazoles, thiazoles, oxazoles, pyrans, pyridines, quinolines, isoquinolines, pyrimidines, pyridazines, pyrazines, and the like, all of which are converted to the corresponding nitriles. Preferred reactants in this group are the mono-, di- and trialkyl pyridines.

Preferably the process will be carried out with those alkyl-substituted hydrocarbons selected from the group of benzenes and naphthalenes, and most preferably will be used to make isophthalonitrile from m-xylene, terephthalonitrile from p-xylene, and 2,6-dicyanonaphthalene from 2,6-dimethylnaphthalene.

As an example to further illustrate the invention, for each 1659 parts by weight of $V_2O_4$ which enters the ammoxidation reactor and which is entirely converted to $V_2O_3$, 1499 parts of $V_2O_3$ will be formed. This $V_2O_3$ is divided in half, one half being oxidized with air (160 parts of oxygen gas required) for conversion to $V_2O_5$ (910 parts of $V_2O_5$ formed) and combined with the remaining half of $V_2O_3$ (750 parts). The mixture of $V_2O_3$ and $V_2O_5$ is converted in the mixer-heater to 1659 parts of $V_2O_4$ which is fed back into the ammoxidation reactor. This example is based on 100% conversion to the desired oxide products and does not provide for mechanical losses, but it will be understood that separate feeds of $V_2O_4$, $V_2O_3$ and $V_2O_5$ to the appropriate lines may be used to keep the entire system in balance.

The invention claimed is:

1. In the process of carrying out ammoxidation reactions in a moving bed reactor using $V_2O_4$ as catalyst and without added oxygen, the improvement which comprises:
   (a) separating spent catalyst consisting essentially of $V_2O_3$ from ammoxidation products and unreacted starting materials,
   (b) oxidizing a portion of said $V_2O_3$ to $V_2O_5$,
   (c) mixing said $V_2O_5$ with the remaining $V_2O_3$,
   (d) heating said mixture to a temperature between about 350° and 500° C. whereby $V_2O_4$ is formed, and
   (e) feeding said $V_2O_4$ to said ammoxidation process for use as catalyst.

2. The process of Claim 1 where p-xylene is ammoxidized to terephthalonitrile.

3. The process of Claim 1 where m-xylene is ammoxidized to isophthalonitrile.

4. The process of Claim 1 where 2,6-dimethylnaphthalene is ammoxidized to 2,6-dicyanonaphthalene.

References Cited
UNITED STATES PATENTS 2,450,639  10/1948  Denton _____ 260—465
2,180,353  11/1939  Foster _____ 252—461

LEWIS GOTTS, Primary Examiner

D. H. TORRENCE, Assistant Examiner

U.S. Cl. X.R.

260—283 CN, 294.9, 302 R, 307 R, 309, 310 R, 319.1, 326.62, 329 R, 346.1 R, 464, 465.9; 252—461